United States Patent
Balestier et al.

(10) Patent No.: US 9,974,413 B2
(45) Date of Patent: May 22, 2018

(54) MACHINE FOR PREPARING BEVERAGES

(71) Applicant: ILLYCAFFE' S.P.A., Trieste (IT)

(72) Inventors: Diego Balestier, Trieste (IT); Franciscus Benedictus Maria Van Eeden, Trieste (IT); Cosimo Fusco, Trieste (IT)

(73) Assignee: ILLYCAFFE' S.P.A., Trieste (IT)

( * ) Notice: Subject to any disclaimer, the term of this patent is extended or adjusted under 35 U.S.C. 154(b) by 271 days.

(21) Appl. No.: 14/773,706

(22) PCT Filed: Feb. 27, 2014

(86) PCT No.: PCT/EP2014/053837
§ 371 (c)(1),
(2) Date: Sep. 8, 2015

(87) PCT Pub. No.: WO2014/135438
PCT Pub. Date: Sep. 12, 2014

(65) Prior Publication Data
US 2016/0045061 A1 Feb. 18, 2016

(30) Foreign Application Priority Data

Mar. 7, 2013 (IT) .............................. MI2013A0345

(51) Int. Cl.
*A47J 31/06* (2006.01)
*A47J 31/46* (2006.01)
*A47J 31/44* (2006.01)

(52) U.S. Cl.
CPC ........... *A47J 31/46* (2013.01); *A47J 31/4403* (2013.01); *A47J 31/4457* (2013.01)

(58) Field of Classification Search
CPC ..... A47J 31/46; A47J 31/4403; A47J 31/4457
(Continued)

(56) References Cited

U.S. PATENT DOCUMENTS

2011/0083563 A1* 4/2011 Branson ................. A47J 27/04
99/410
2013/0284107 A1* 10/2013 Lari ..................... A01K 63/006
119/259

FOREIGN PATENT DOCUMENTS

CN 201370471 Y 12/2009
DE 202008012456 U1 2/2010
(Continued)

OTHER PUBLICATIONS

International Search Report and Written Opinion dated Apr. 17, 2014 re: Application No. PCT/EP2014/053837; citing: JP 2000 308579 A and DE 20 2008 012456 U1; pp. 1-3.
(Continued)

*Primary Examiner* — Thien S Tran
(74) *Attorney, Agent, or Firm* — Scully, Scott, Murphy & Presser, P.C.

(57) ABSTRACT

A machine for preparing beverages, particularly for preparing espresso coffee, comprising a base (2) and a head (3) for dispensing the beverage that is provided with an extraction chamber adapted to accommodate a portion of at least one ingredient of the beverage, and in particular a dose of roasted and ground coffee, and connected to a water reservoir (4) by means of a pump (5). The machine comprises a support (6) for a container (6a) of the beverage dispensed by the dispensing head (3). The support (6) of the container of the beverage is interposed axially between the dispensing head (3) and the reservoir (4), so that the dispensing head (3), the support (6) and the reservoir (4) are crossed by an axis (A) that is substantially perpendicular to the base (2).

15 Claims, 16 Drawing Sheets

(58) Field of Classification Search
USPC .................. 99/279–282, 285, 286, 295, 303; 426/425, 595
See application file for complete search history.

(56) References Cited

FOREIGN PATENT DOCUMENTS

| | | | |
|---|---|---|---|
| EP | 1579793 | A1 | 9/2005 |
| JP | 2000308579 | A * | 11/2000 |
| JP | 2002-58599 | A | 2/2002 |
| JP | 2009-183704 | A | 8/2009 |
| JP | 2012-35119 | A | 2/2012 |
| WO | 2008011913 | A1 | 1/2008 |

OTHER PUBLICATIONS

English-language translation of Japanese Office Action dated Nov. 7, 2017 received in Japanese Patent Application No. 2015-560626.
Chinese Office Action dated May 27, 2017 received in Chinese Patent Application No. 201480012748.1.

* cited by examiner

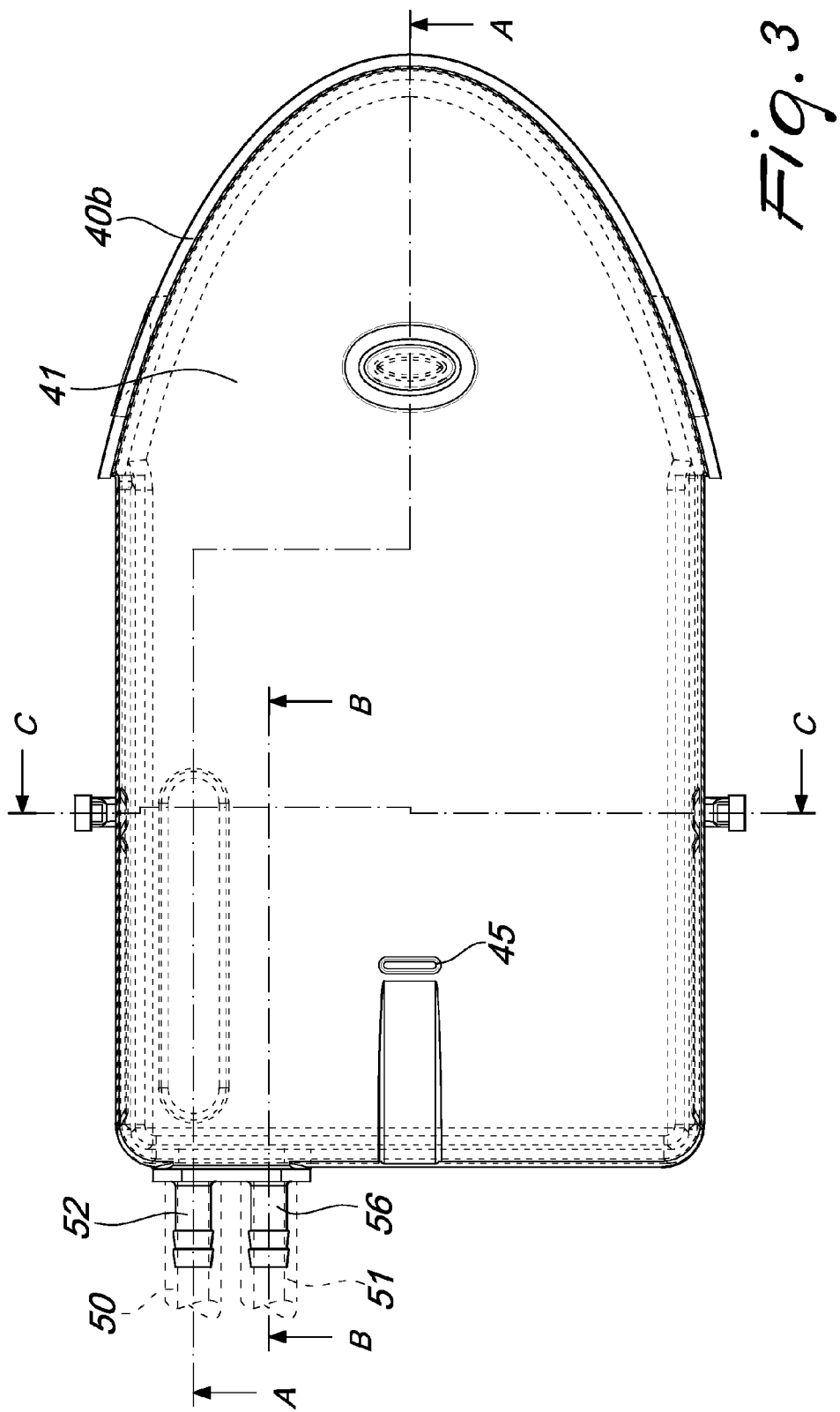

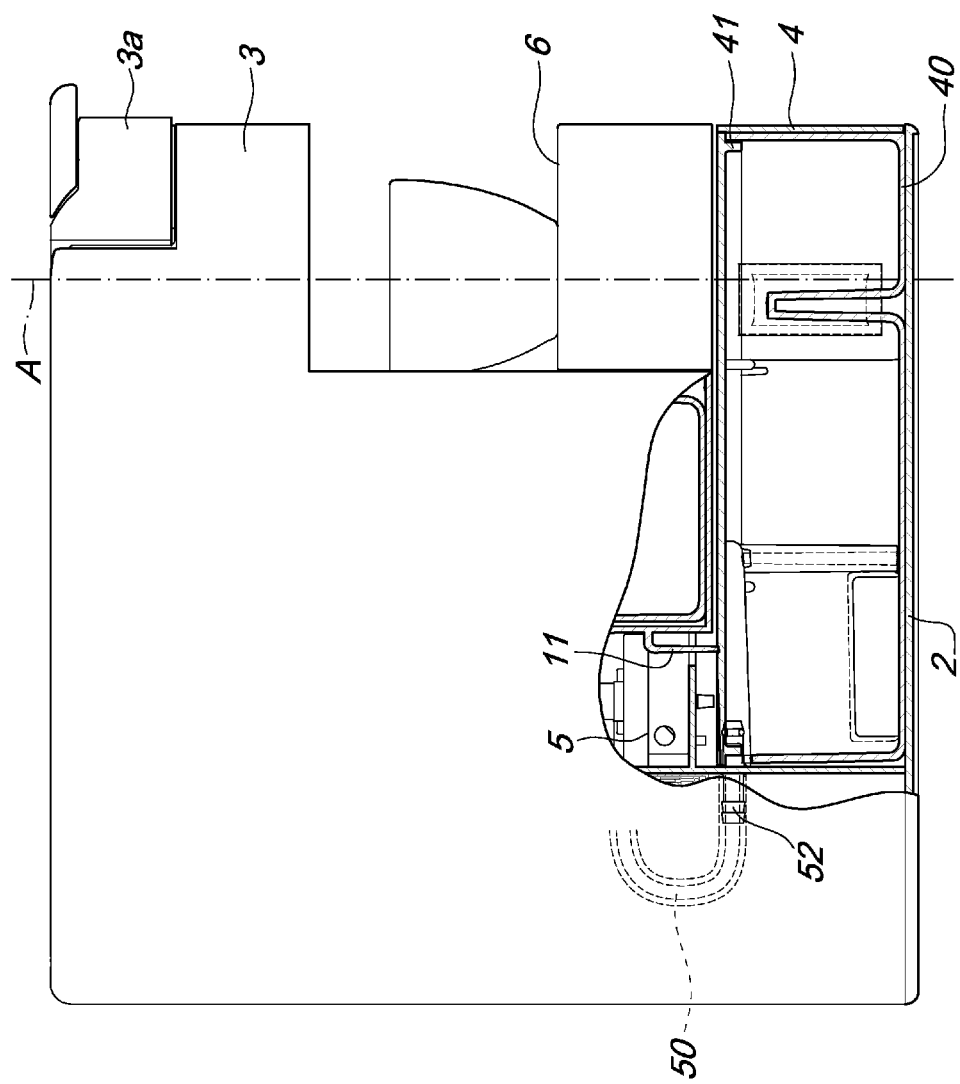

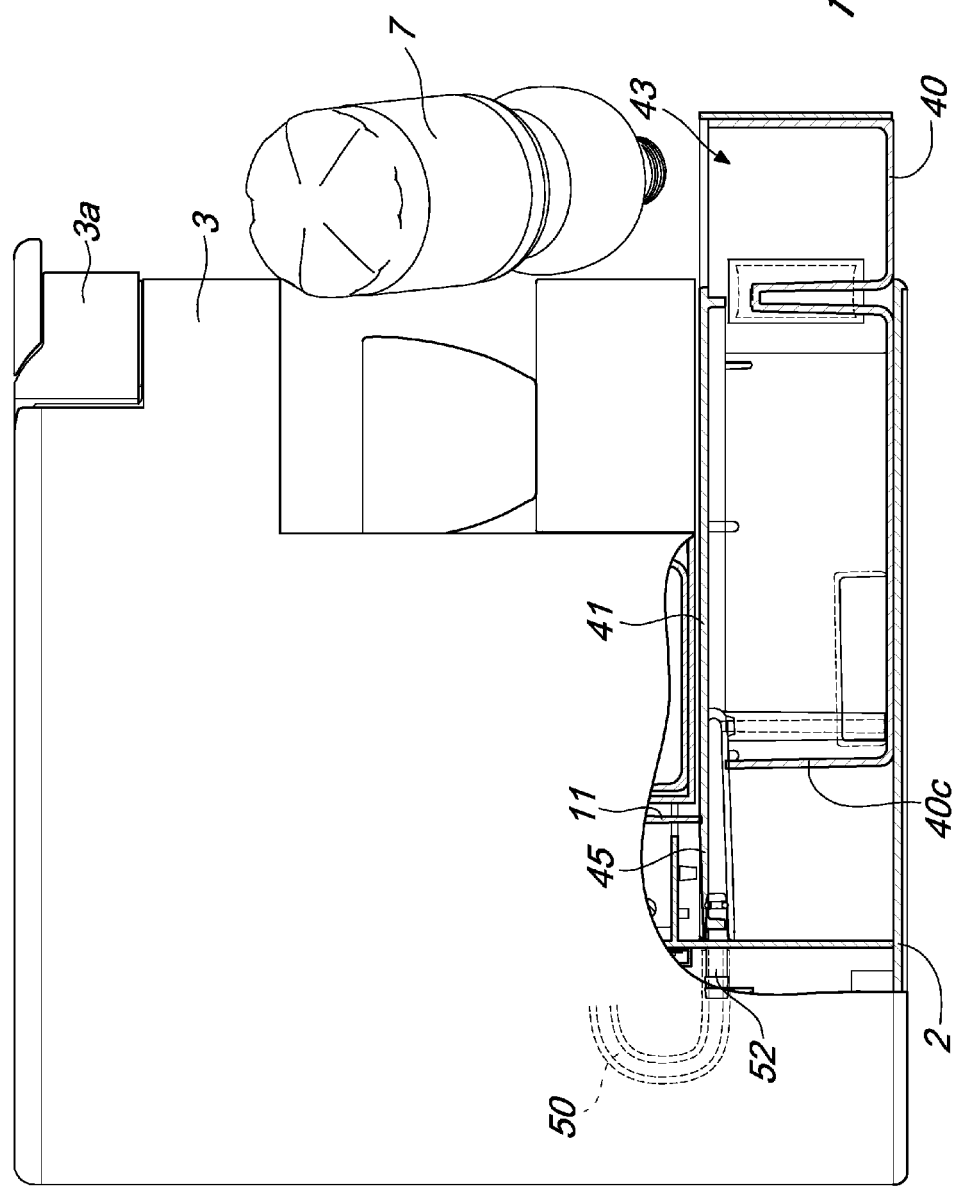

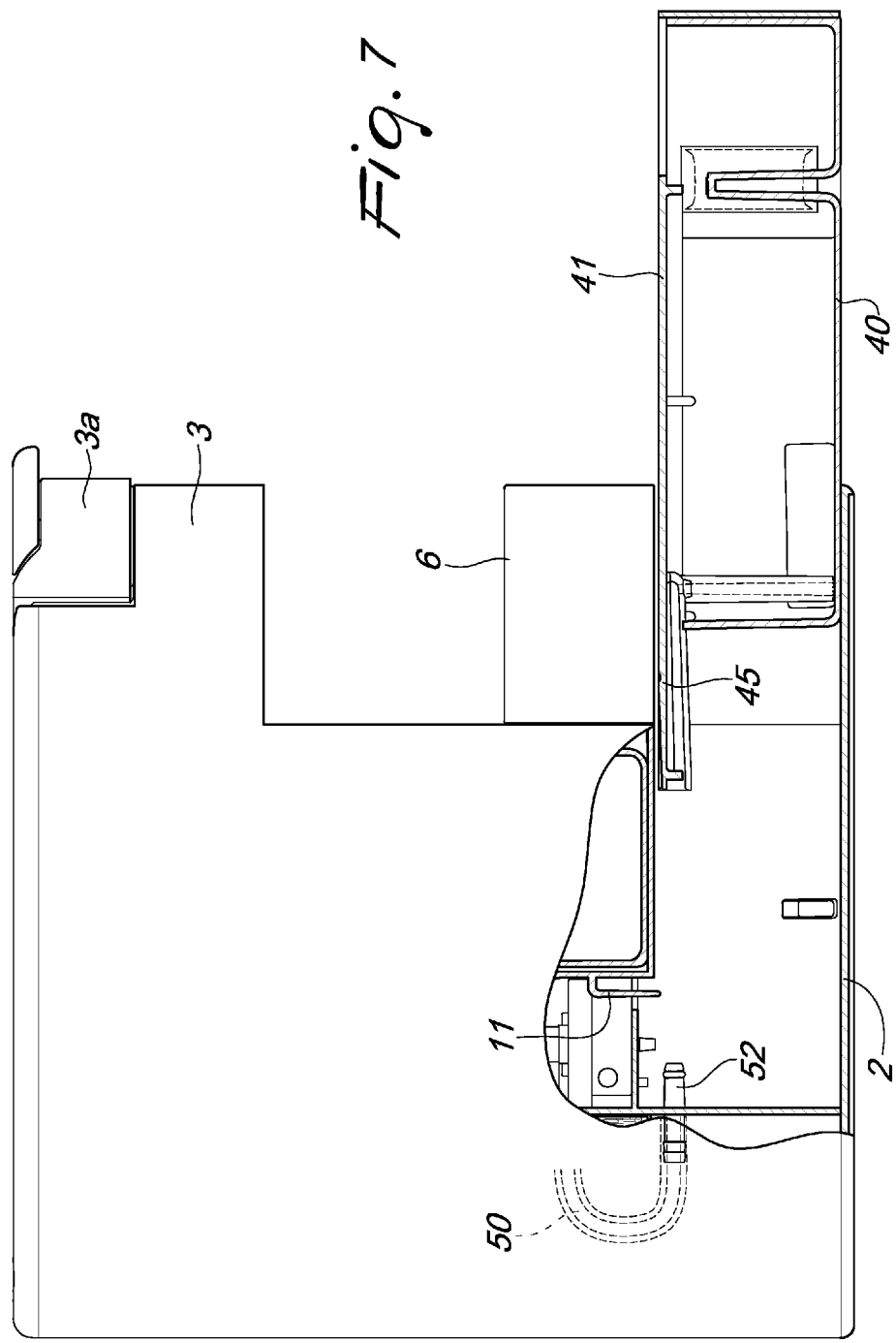

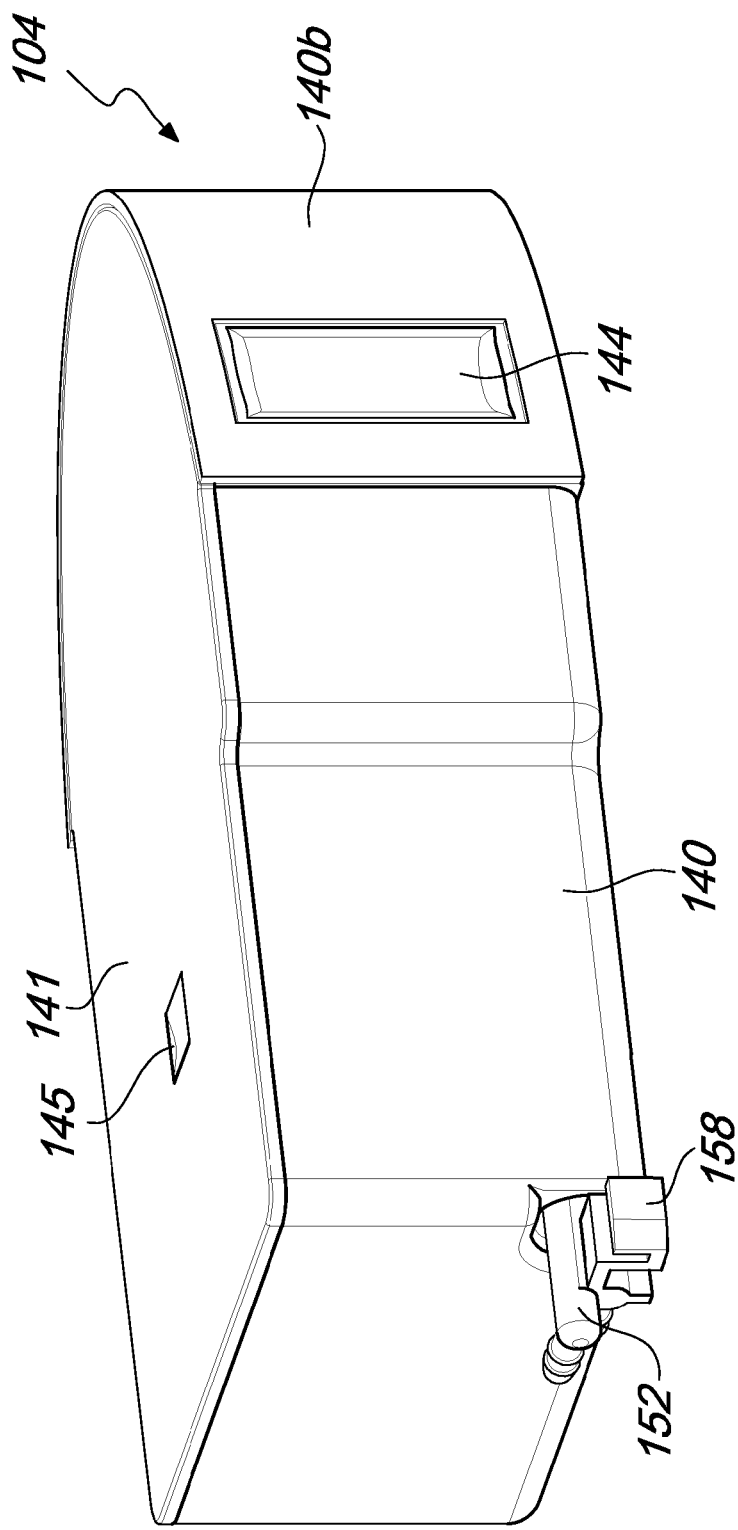

MACHINE FOR PREPARING BEVERAGES

TECHNICAL FIELD

The present invention relates to a machine for preparing beverages starting from ingredients prepared in portions, using a volume of water contained in a reservoir of the machine. The ingredients prepared in portions are preferably contained in cartridges or pods and can comprise roasted and ground coffee or soluble coffee or edible substances in powder form, in leaves or in freeze-dried form, or can be concentrates. In particular, the invention relates to a machine for extracting espresso coffee starting from a dose of roasted and ground coffee preferably contained in a cartridge or in a pod.

BACKGROUND

The popularity of household machines for preparing beverages, particularly espresso coffee, starting from ingredients prepared in portions and contained in cartridges or pods, is increasing alongside an ever increasing need to adapt these machines to the spaces available in the rooms in which said machines are placed.

However, the technical choices to achieve this goal are mostly aimed at reducing the dimensions of the machines by means of a redesign of the internal components that can have a negative influence on the quality of the resulting beverage.

One of the components that influence negatively the space occupation of the machine is the reservoir of the water used to obtain the beverage, which usually has the appearance of a component arranged on one of the sides of the machine.

BRIEF SUMMARY

The aim of the present invention is to obviate the drawbacks of the background art, providing a machine for preparing beverages starting from ingredients prepared in portions that has a reduced space occupation without thereby degrading the quality of the resulting beverage.

Within this aim, the invention provides a machine for preparing beverages starting from ingredients prepared in portions in which the size of the water reservoir does not affect the peripheral space occupation of the machine.

The invention further provides a machine for preparing beverages starting from ingredients prepared in portions in which it is possible to fill and/or top up the reservoir even during the extraction of the beverage from the ingredients prepared in portions without interrupting or influencing the extraction process, and avoiding for this purpose the separation of the reservoir from its seat.

Moreover, the invention keeps the water reservoir far from heat sources inside the machine, reducing the risk of the forming of scale in the reservoir and of degeneration of the quality of the water collected in the reservoir due to the possible proliferation of microorganisms.

Another object of the present invention is to avoid a reduction of the volume of water that is present in the reservoir due to evaporation phenomena.

The invention further prevents the water vapor produced by means of said evaporation phenomena from damaging the components inside the machine, reducing their lifespan.

The invention also increases the structural stability of the machine for preparing beverages starting from ingredients prepared in portions.

The invention provides a machine for preparing beverages starting from ingredients prepared in portions that is highly reliable, relatively easy to provide and has competitive costs.

More particularly, a machine is provided for preparing beverages, comprising a base and a head for dispensing the beverage that is provided with an extraction chamber that is adapted to accommodate a portion of at least one ingredient of the beverage and is connected to a water reservoir by means of a pump, said machine comprising a support for a container of the beverage dispensed by the dispensing head, characterized in that the support of the container of the beverage is interposed axially between the dispensing head and the reservoir, so that the dispensing head, the support of the beverage container and the reservoir are crossed by an axis that is substantially perpendicular to the base.

BRIEF DESCRIPTION OF THE DRAWINGS

Further characteristics and advantages of the invention will become more apparent from the description of preferred but not exclusive embodiments of the machine for preparing beverages starting from ingredients prepared in portions according to the invention, illustrated by way of non-limiting example in the accompanying drawings, wherein:

FIG. 3 is a top plan view of the water reservoir of the machine of FIG. 1;

FIG. 5 is a partially sectional side view, along the longitudinal central plane of the machine of FIG. 1, in the normal configuration for use;

FIG. 6 is a partially sectional side view, along the longitudinal central plane of the machine of FIG. 1, with the reservoir partially extracted for topping up;

FIG. 7 is a partially sectional side view, along the longitudinal central plane of the machine of FIG. 1, in the configuration of complete extraction of the reservoir prior to separation from the machine;

FIG. 9 is a perspective view of the water reservoir of the machine of the preceding figure;

DETAILED DESCRIPTION

Figure 1:
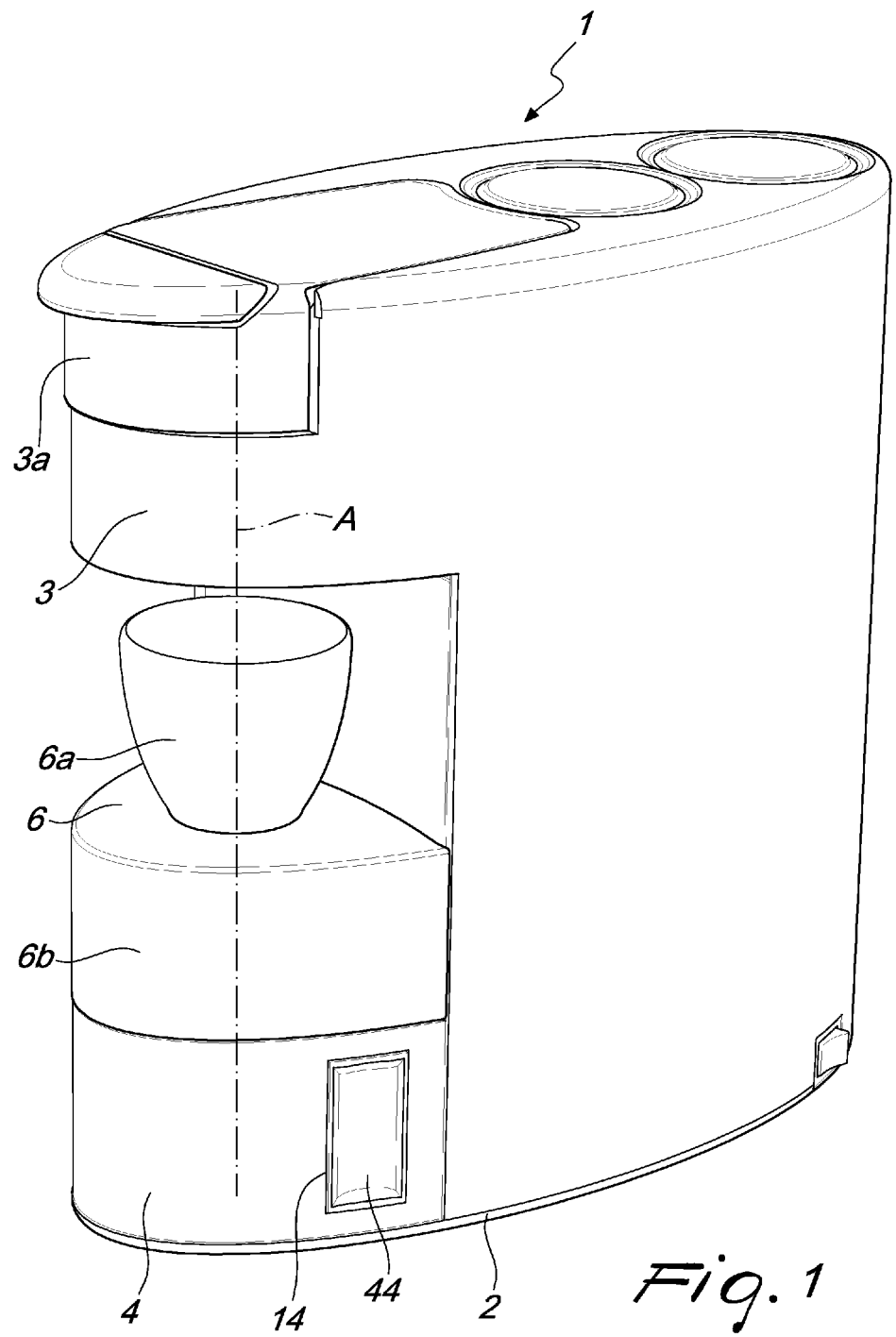
FIG. 1 is a perspective view of a first embodiment of the machine according to the invention.

With reference to the figures, numerals lower than 100 designate the elements of the first embodiment of the invention and numerals from 100 onward designate the elements of the second embodiment of the invention.

A machine according to the invention, generally designated by the reference numeral 1 or 101 depending on the embodiment being considered, comprises a base 2, 102 and a head 3, 103 for dispensing the beverage, which is provided with an extraction chamber (not shown) that is adapted to accommodate a portion of at least one ingredient of the beverage, said portion being contained preferably in a cartridge or pod.

In the present description, the machine 1, 101 is a machine for extracting espresso coffee and reference shall be made to roasted and ground coffee as the only ingredient in portions that is used, in combination with hot water under pressure, to obtain the beverage, which in the specific case is indeed espresso coffee.

The roasted and ground coffee can be contained in a pod, capsule or cartridge that can be accommodated in the extraction chamber, for example in the cartridge described in European patent EP 2 049 416.

It is understood that the ingredient prepared in portions, contained in a pod, capsule or cartridge, instead of being roasted and ground coffee, can be soluble coffee or another consumable substance in powder form, in leaves or in freeze-dried form, or can be a concentrate.

The base 2 is substantially flat or in any case comprises supporting feet that lie substantially on a same plane.

The dispensing head 3, 103 is connected to a water reservoir 4, 104 by means of a pump 5, 105. The hydraulic circuit of the pump 5, 105 can be connected to a heating element, not shown, which is adapted to heat the water drawn by the pump 5, 105 to the desired temperature, which is comprised for example between 90° C. and 99° C.

The dispensing head 3, 103 can be like the one shown, i.e., provided with a loading door 3*a*, 103*a* for access to an extraction chamber that is enclosed completely within the dispensing head. As an alternative, the dispensing head can be of the type with filter basket holder, i.e., in which the extraction chamber is formed partly by a filter basket holder that can be removed from the machine and supports the ingredient prepared in portions, as described for example in European patent EP 1 579 793.

The machine 1, 101 comprises a support 6, 106 for a container 6*a* of the beverage dispensed by the dispensing head 3, 103, for example a cup, a mug or a glass. The support 6, 106 can be coupled to a drip catcher 6*b*, 106*b* and optionally can be overturned or removed from the machine 1, 101.

The support 6, 106 is interposed axially between the dispensing head 3, 103 and the reservoir 4, 104, so that the dispensing head 3, 103, the support 6, 106 and the reservoir 4, 104 are all crossed by a same axis A, A' that is perpendicular to the plane of the base 2, 102.

The axis A, A' can be the one that passes through the opening of the dispensing head 3, 103 from which the beverage is dispensed into the container 6*a* or can be parallel in a neighborhood of this axis, for example for a radius that corresponds to the radius of a cup.

The water reservoir 4, 104 is preferably movable with respect to the base 2, 102 between at least two positions in which the reservoir 4, 140 remains in any case hydraulically connected to the pump 5, 105. In particular, the reservoir 4, 104 is accommodated completely in a seat of the machine 1, 101 that is arranged below the support 6, 106 and the corresponding drip catcher and comprises a surface that can be accessed from the outside so as to be able to extract the tank 4, 104 by sliding it from the front part of the machine 1, 101. The expression "front part of the machine" references the side of the machine toward which the dispensing head 3, 103 and the support 6, 106 of the container of the dispensed beverage protrude.

With this extraction possibility, the machine 1, 101 can occupy other limited space, since the reservoir 4, 104 can be removed from the same part of the machine on which there are normally no external hindrances, i.e., the part where the user works to access the extraction chamber and the support of the cup during beverage preparation. Therefore it is no longer necessary to provide an additional space around the machine to provide the space needed to extract the reservoir, as occurs instead in machines of the known type.

Furthermore, the fact that the reservoir 4, 104 is axially below the support 6, 106 makes it possible to extract partially the reservoir even during beverage extraction without any obstacles, reducing the number of operations to be performed by the user.

Figure 8:
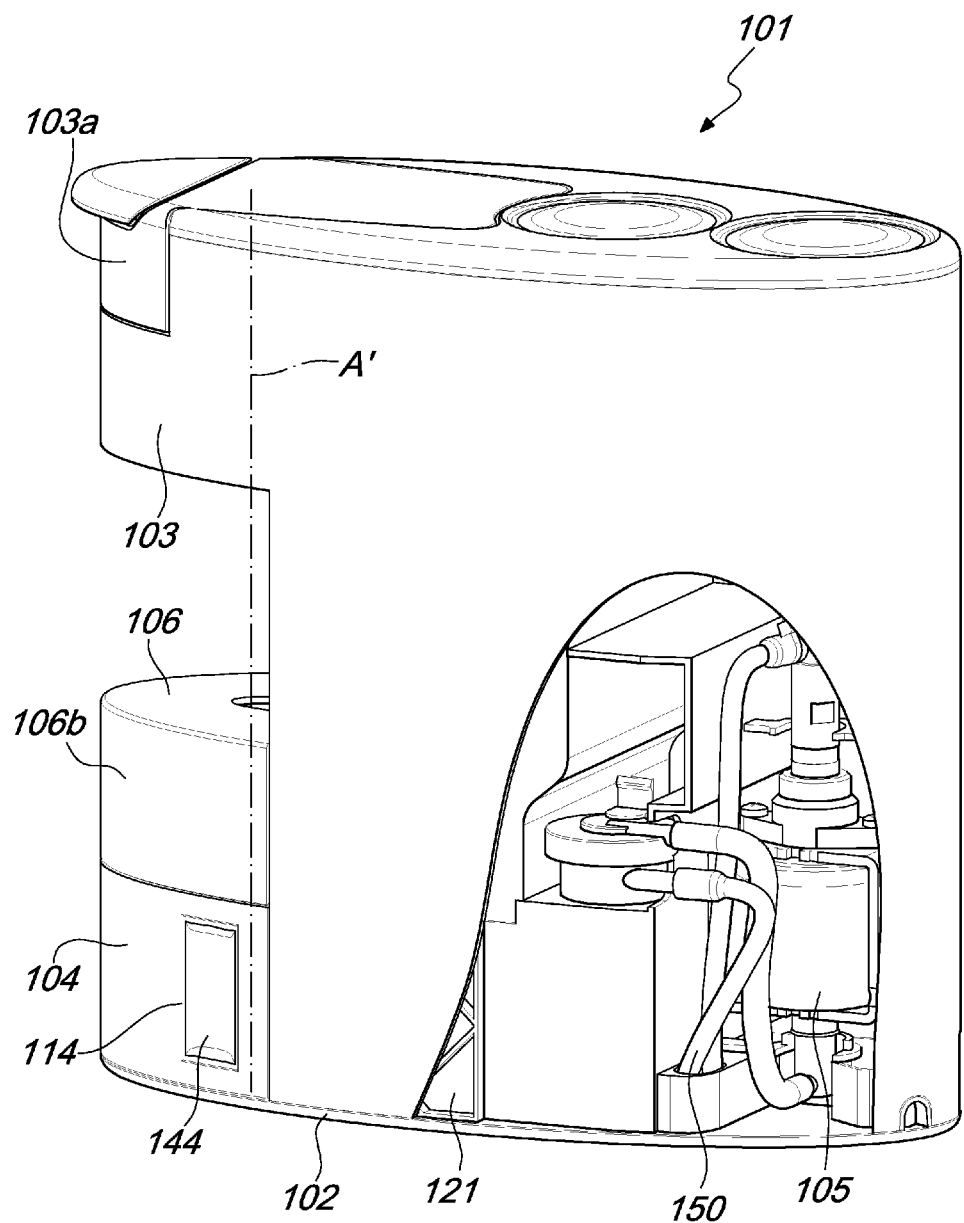
FIG. 8 is a partially cutout perspective view of a second embodiment of the machine according to the invention.
Figure 10A:
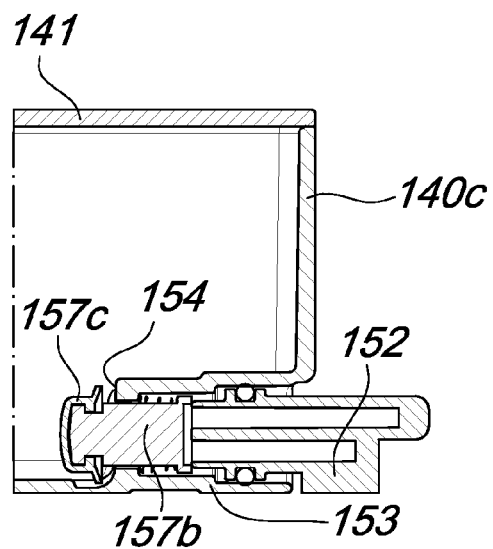
FIGS. 10a and 10b are sectional views of the valve and of the connector with the pump of the reservoir used in the machine of FIG. 8 in two different positions of the reservoir.
Figure 10B:
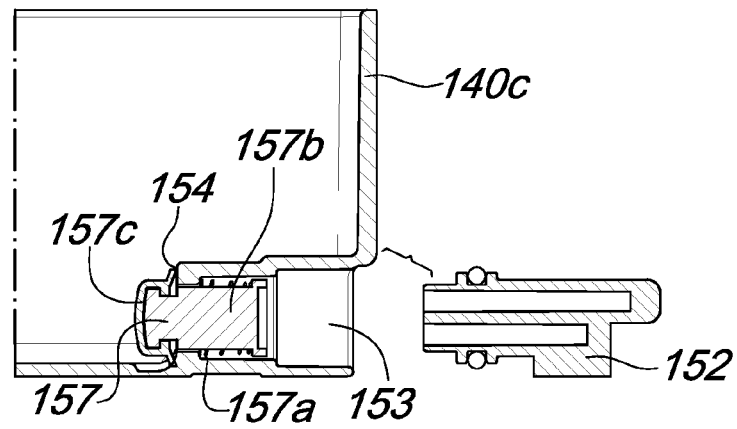
Figure 11:
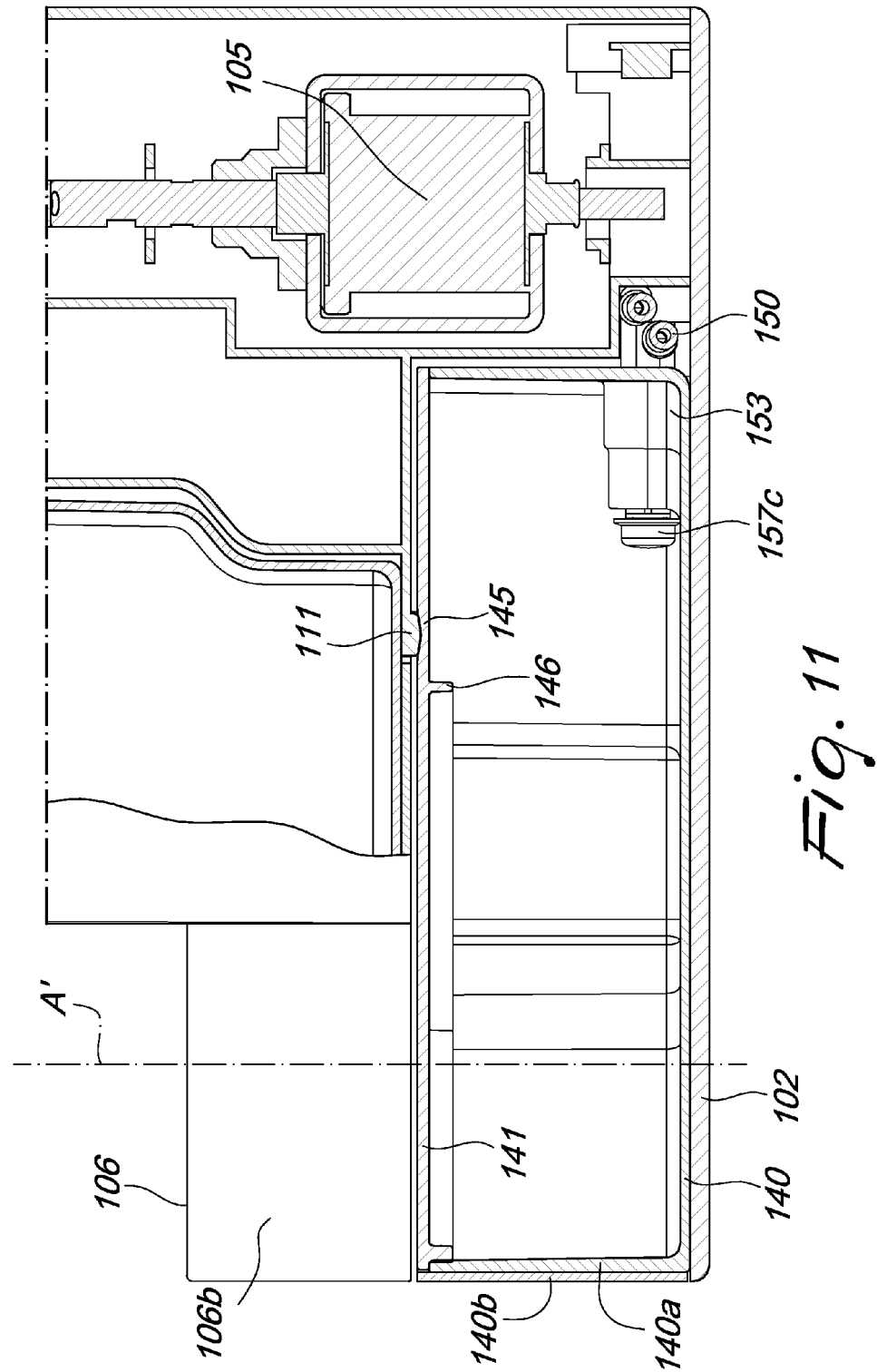
FIG. 11 is a sectional view, along the longitudinal central plane of the lower part of the machine of FIG. 8.
Figure 12:
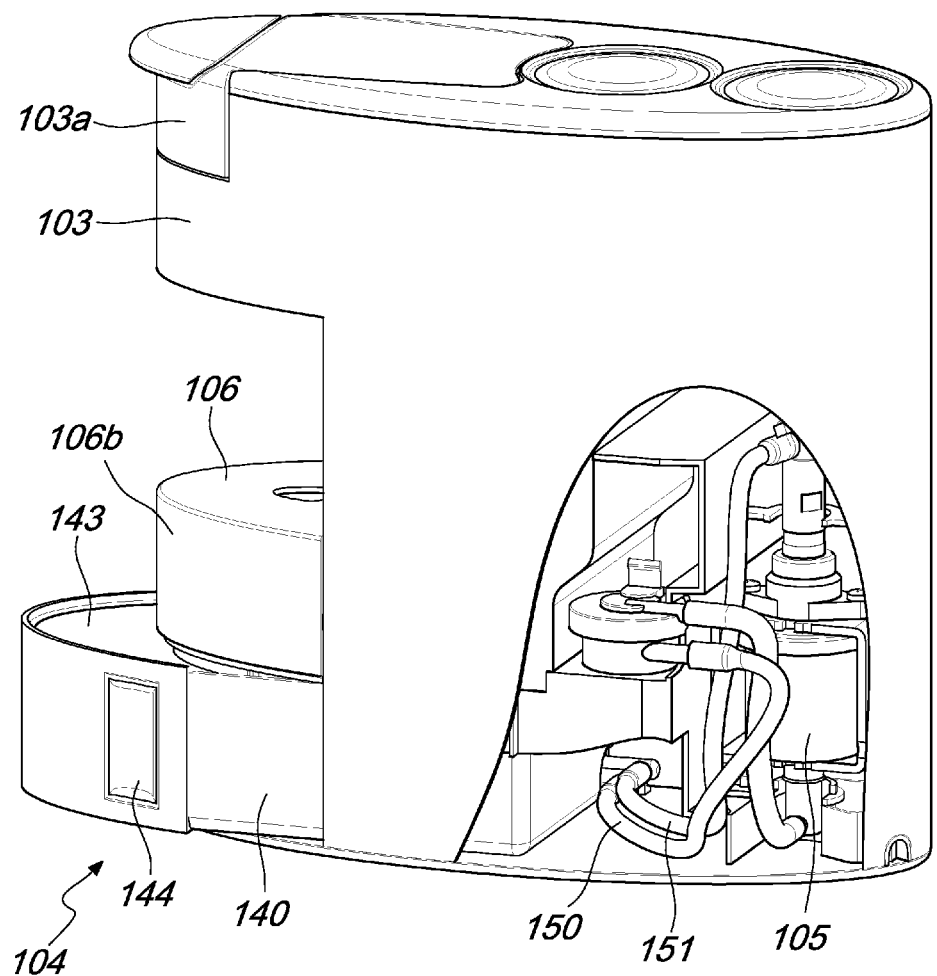
FIG. 12 is a partially cutout perspective view of the machine of FIG. 8 with the water reservoir partially extracted to allow topping up.
Figure 13:
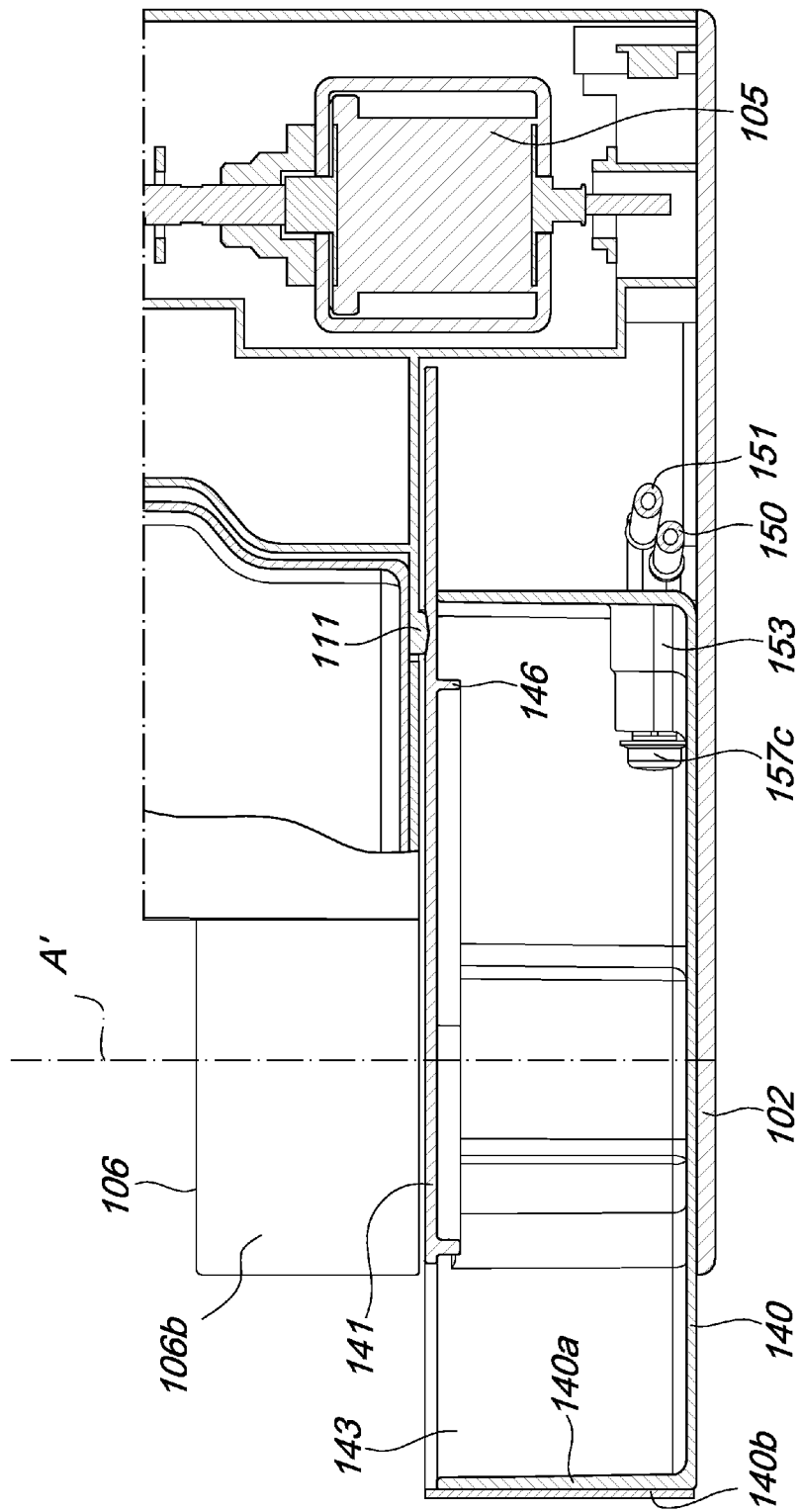
FIG. 13 is a sectional view, along the longitudinal central plane, of the lower part of the machine of the preceding figure.
Figure 14:
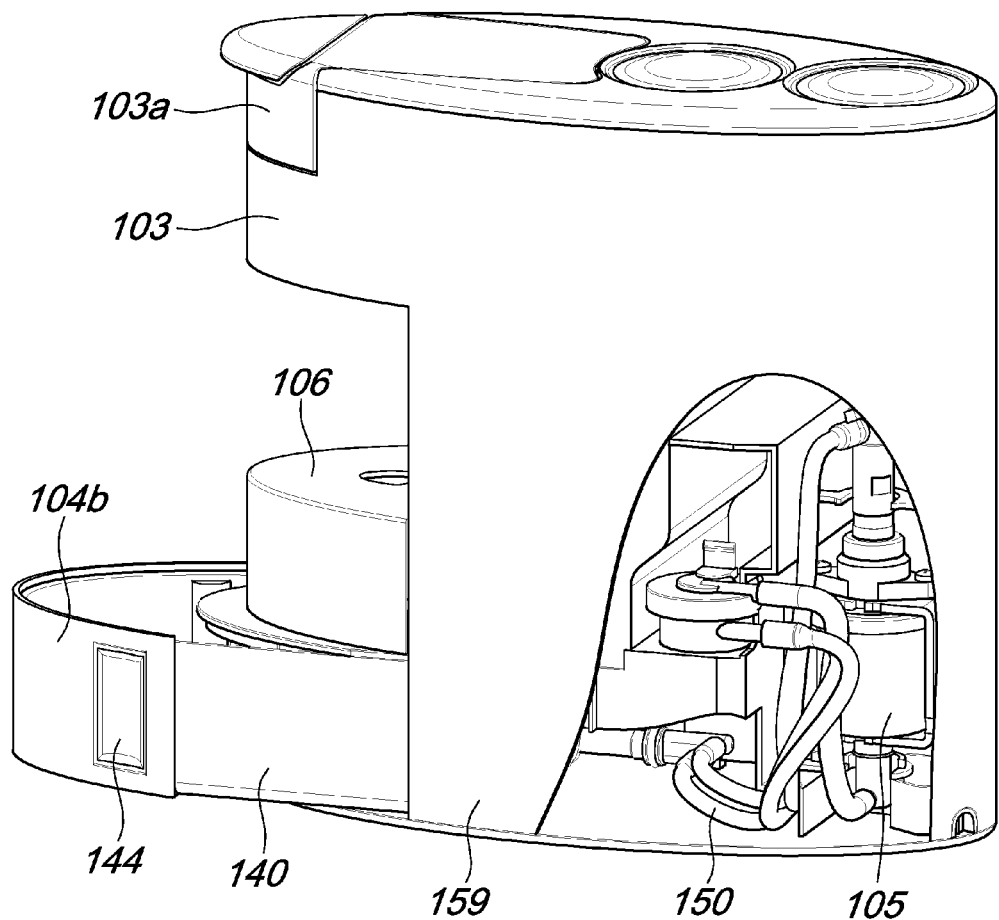
FIG. 14 is a partially cutout perspective view of the machine of FIG. 8, with the water reservoir in the position prior to separation from the machine.
Figure 15:
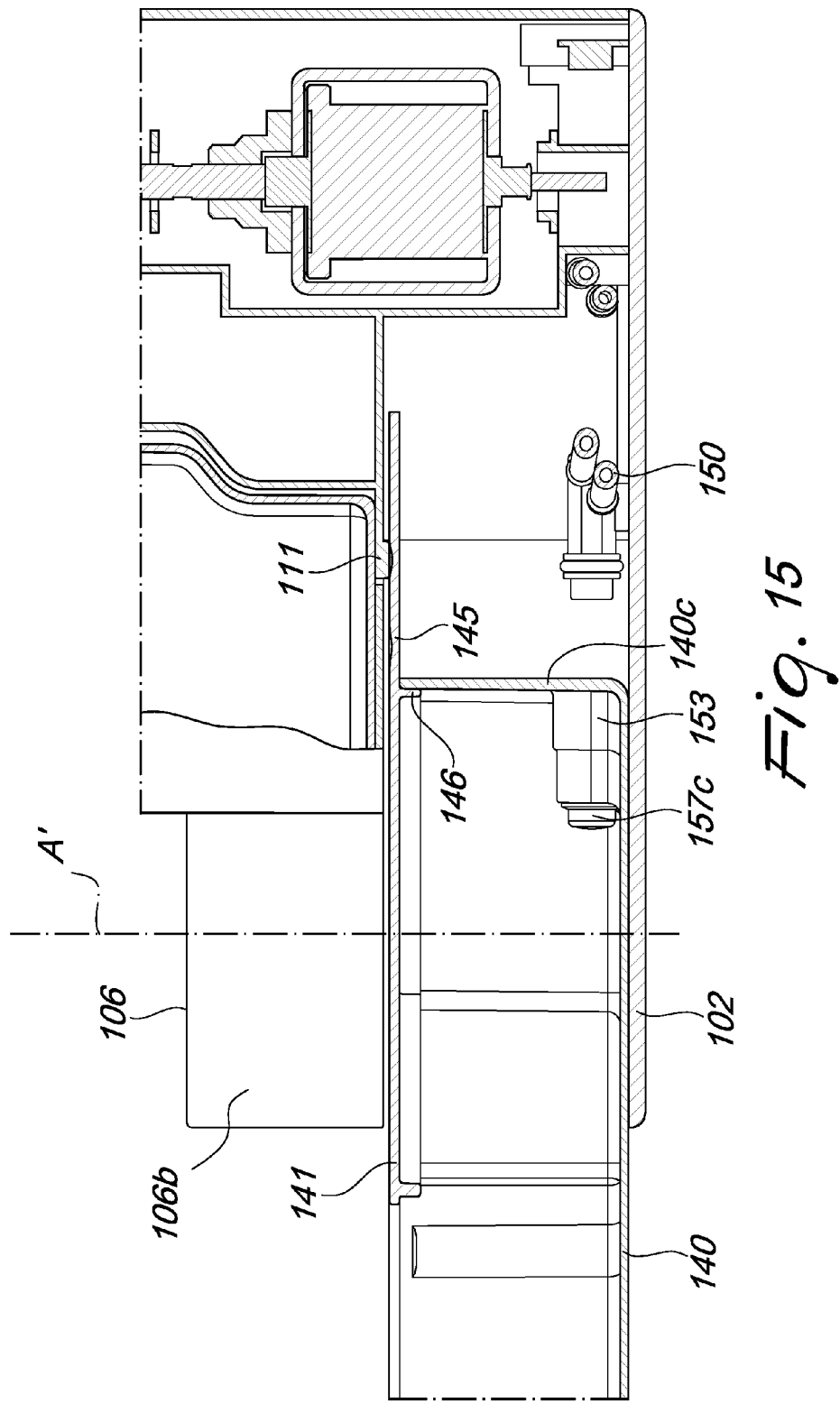
FIG. 15 is a sectional view, along the longitudinal central plane, of the lower part of the machine of the preceding figure.

The stable positions that can be reached by the reservoir 4, 104 are at least two and comprise a working position, shown in FIGS. 1 and 8, in which the reservoir 4, 104 is inserted completely in the machine 1, 101, and a top-up position, shown in FIGS. 6 and 12, in which the reservoir provides outside the machine 1, 101 an opening 43, 143 for introducing water in the reservoir 4, 104 even during the dispensing of the beverage into the container 6*a*, for example by pouring the water into the reservoir 4, 104 directly from a bottle 7.

More precisely, the reservoir 4, 104 comprises a tank 40, 140 and the machine 1, 101 comprises at least one lateral guide 21, 121 to allow the sliding of the tank 40, 140 along a direction that is substantially perpendicular to the axis A, A' between at least the two working and top-up positions described above.

In the embodiments shown, the tank 40, 140, made of a material that is substantially transparent to natural light, has a front wall 40*a*, 140*a* that is covered by an opaque screen or front plate 40*b*, 140*b*, so as to form the only surface of the tank 40, 140 that faces the outside of the machine 1, 101.

The front wall 40*a*, 140*a* of the tank can comprise advantageously at least one window or pair of windows 44, 144, as in the illustrated case, which, in combination with corresponding cutouts 14, 114 provided in the opaque screen 40*b*, 140*b*, allow an inspection of the level of the water of the reservoir from the outside of the machine 1, 101, at the same time preventing most ambient light from entering the tank thanks to the limited size of the windows 44, 144 made available by the screen 40*b*, 140*b*. In this manner the risks of degeneration of the quality of the water collected in the tank 40, 140 by ambient light are reduced.

The windows 44, 144 can be optionally associated with at least one protrusion or at least one hollow that is adapted to provide a tactile indicator for gripping said reservoir. This protrusion or hollow can be obtained for example by providing the windows 44, 144 with a convex or concave shape during manufacture of the tank 40, 140.

The reservoir 4, 104 can comprise a water level indicator. This can be a pin 47 that protrudes from the bottom of the tank 40 to the maximum level of the water allowed in the tank 40. The pin 47 is visible through the opening 43 for introducing top-up water and optionally through the windows 44.

As an alternative, the level of the water can be indicated by means of level lines provided in the windows 44, 144 and/or by means of a ridge along the front wall 40*a*, 140*a* of the tank 40, 140 and/or by means of a wing arranged inside the front wall 40*a*, 140*a* that follows the internal profile of the tank 40, 140 and/or by means of a float and/or by means of any device adapted to indicate a maximum level of water contained in the reservoir.

The reservoir 4, 104 can comprise furthermore a lid 41, 141 that is adapted to cover at least partially or, as in the specific examples, completely the tank 40, 140. In this case, the lid 41, 141 and the tank 40, 140 can slide with respect to each other and the machine 1, 101 comprises a stop element 11, 111 to prevent the lid 41, 141 from being dragged together with the tank 40, 140 when said tank is extracted from the machine 1, 101 toward the top-up position.

The stop element 11, 111 can be provided by means of a hook, as in the examples shown in the figures, which engages by snap action a corresponding abutment 45, 145 that is present on the lid 41, 141, for example a hollow or an impression.

Advantageously, the lid 41, 141 can comprise furthermore at least one stroke limiter 46, 146, obtained for example during molding as a protrusion on the surface of the lid 41, 141 that is intended to be directed toward the tank 40, 140.

The stroke limiter 46, 146 of the lid 41, 141 forms an abutment for a rear side wall 40c, 140c of the tank 40, 140 during sliding for extraction thereof from the inside of the machine 1, 101 toward the top-up position.

Once the rear side wall 40c, 140c abuts against the stroke limiter 46, 146, an additional traction away from the machine 1, 101 of the tank 40, 140 causes the reservoir 4, 140 to leave the top-up position and entails the release of the stop element 11, 111, which in the working position is engaged with slight interference with the hollow or impression 45, 145 of the lid 41, 141. The tank 40, 140 entrains therefore, with its sliding motion, the lid 41, 141 beyond the top-up position. Accordingly, the tank 40, 140 and the lid 41, 141, which is also guided laterally in the seat of the reservoir 4, 104, can be removed completely from the machine 1, 101, for example for washing.

As shown, the reservoir 4, 104 can be extracted at least partially from the machine 1, 101, particularly from the front part thereof.

In order to allow the reservoir 4, 104 to be able to reach the top-up position without uncoupling it from the intake tube 50, 150 of the pump 5, 105, the intake tube 50, 150 is provided with a mouth 52, 152 that can be coupled detachably to a corresponding connector 53, 153 of the reservoir 4, 104.

In the first embodiment, the connector 53, of the conical type, is integral with the lid 41 of the reservoir 4 and is connected to an intake nozzle 54 that extends from the lid 41 substantially to the bottom of the tank 40, so as to allow the pump 5 to draw practically all the water contained in the tank 40. The mouth 52 of the intake tube 50 of the pump 5 can be blocked by interference within the connector 53, using for example one or more O-rings.

Figure 2:
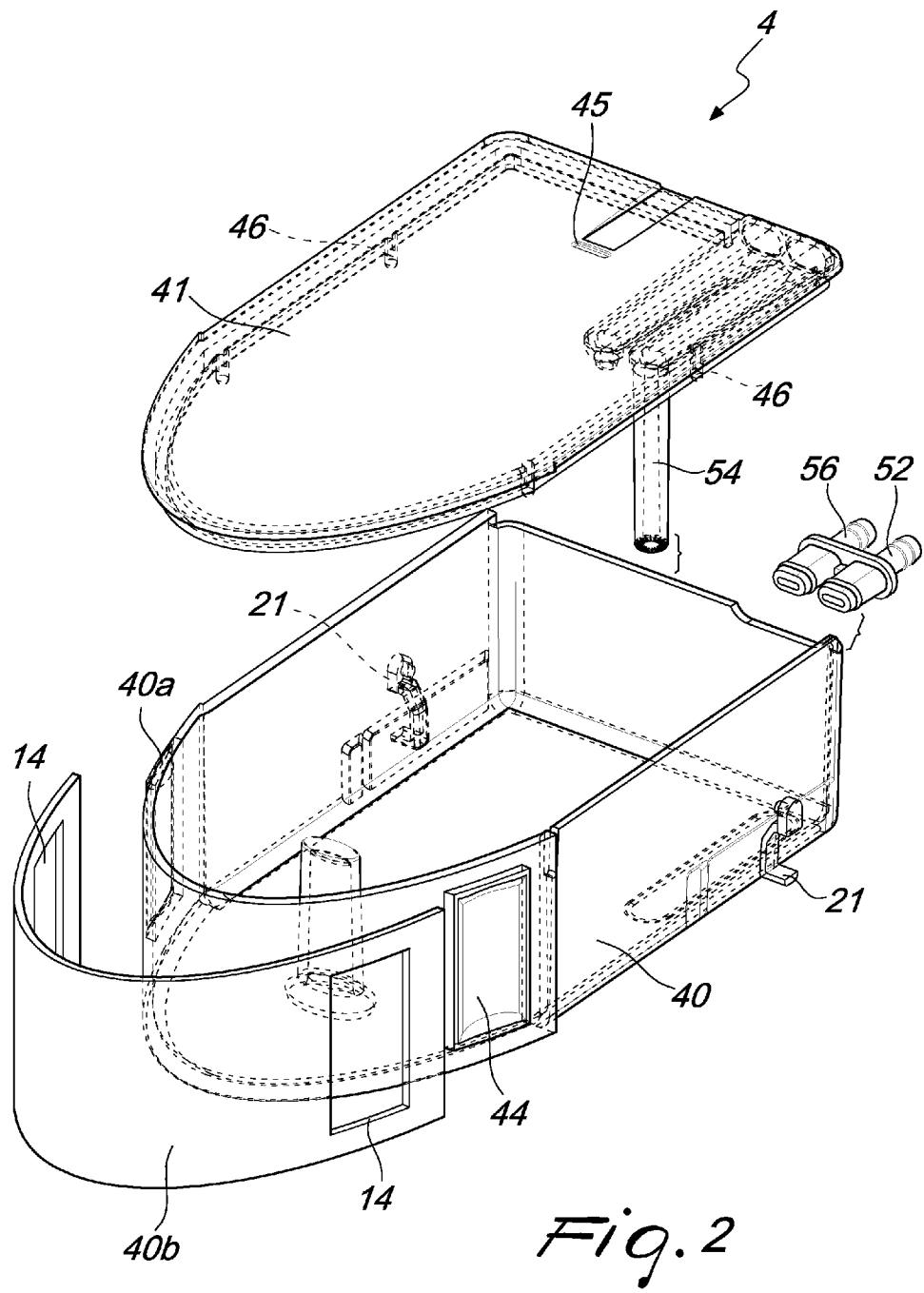
FIG. 2 is an exploded view of the water reservoir of the machine of FIG. 1.
Figure 4A:
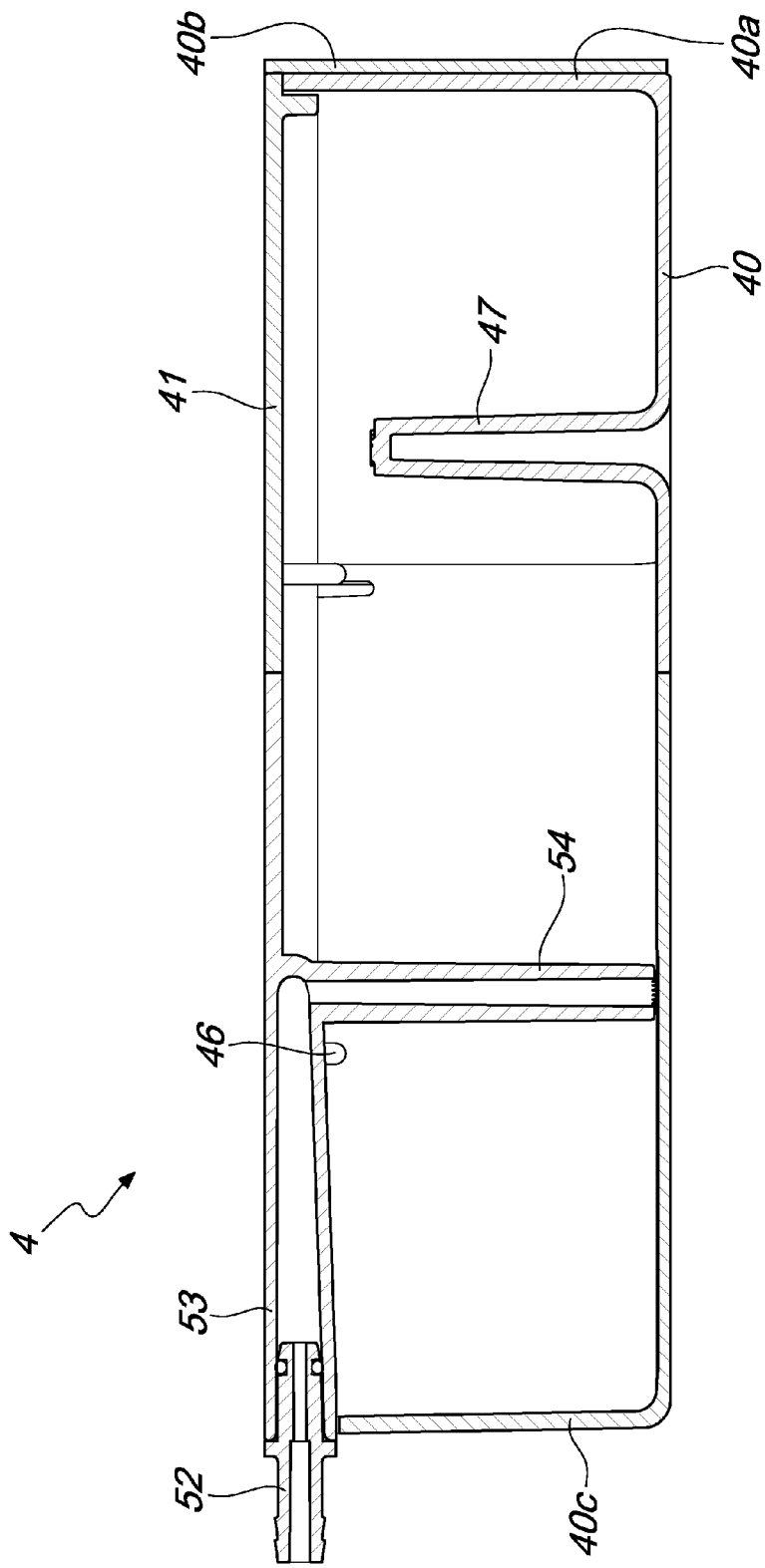
FIGS. 4a, 4b and 4c are respective sectional views of the reservoir, along the planes A-A, B-B and C-C referenced in the preceding figure.
Figure 4B:
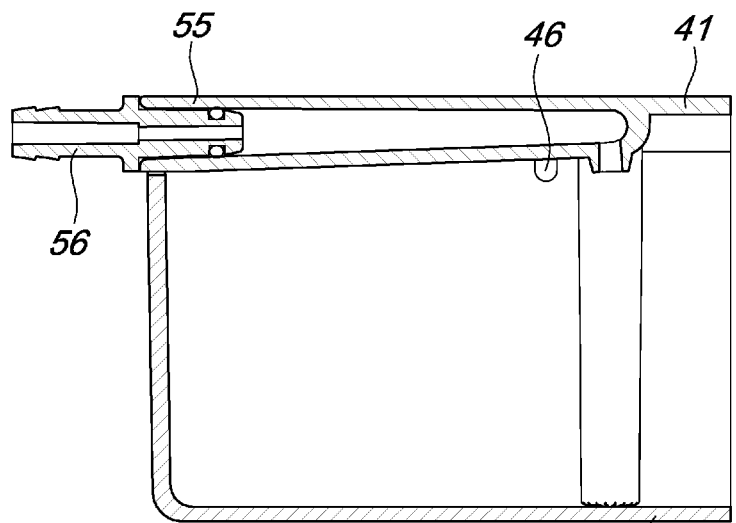
Figure 4C:
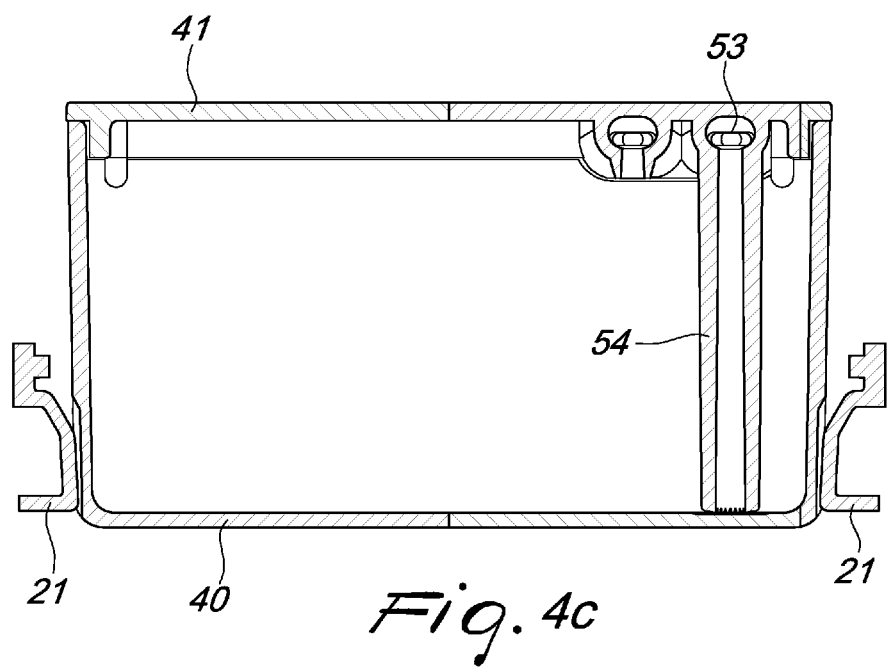

A similar connector 55 can be provided also for the mouth 56 of a draining tube 51 of the pump 5, if present. In this case, the mouths 52 and 56 can be provided as a single molded part, as shown in FIG. 2.

By providing the connector 53 and the optional connector 55 on the lid 41, it is possible to extract the tank 40 to the top-up position without detaching the reservoir 4 from the intake tube 50 and without optionally draining 51 the pump 5. As shown earlier, the lid 41 in fact remains locked by the stop element 41 when the reservoir 4 is brought to the top-up position.

In the second embodiment, instead, the connector 153 for the intake tube 150 of the pump 105 is integral with the tank 140, in particular with the rear wall 140c, and therefore can move together with the tank 140.

In this case, the connector 153 can comprise a poppet valve 157 that is loaded elastically, for example with a helical spring 157a that is coaxial with a stem 157b of the valve, against the connector 153 in order to block it on the side 154 that is connected to the inside of the tank 140, by means of an expanded head 157c of the valve 157 that protrudes toward the inside of the tank 140. The mouth 152 of the intake tube 150 has such a length as to push the poppet valve 157, in particular its stem 157b, away from the opening 154 of the connector 153 that is directed toward the inside of the tank 140 when the mouth 152 is inserted within the connector.

The stem 157b can be provided with an abutment flange for the spring and a recess to allow hydraulic connection between the mouth 152 and the tank 140.

The mouth 152 can integrate in a single part two separate ducts, the first one for intake and the second one, which is optional, for connection to a hydraulic system downstream of the reservoir. For example, the first duct can be connected to the intake tube 150 and the second duct can be connected to the optional draining tube 151 of the pump 105, respectively.

The second duct of the mouth 152 can be used generally as a return by the hydraulic system downstream of the reservoir. For example, it can convey the water that arrives from the pump, as shown, but as an alternative it might convey the water that arrives from a self-resetting valve or a general bypass, but also for example originating from a hydraulic system in order to close/seal the extraction chamber.

Since the mouth 152 of the tubes 150 and 151 and the connector 153 can move together with the reservoir 104 between the working position and the top-up position, the tubes 150 and 151 are flexible and preferably, in order to avoid misalignments with the reservoir 140 during movement between these two positions, the mouth 152 is guided by means of a slider 158, which can interact for example with a rectilinear rail provided on the internal wall of the enclosure 159 of the machine (not shown).

The machine 101 can be provided so that the limit of the stroke of the tank 140 defined by the stroke limiter 146 with respect to the working position of the reservoir 104 coincides with, or is in any case higher than, the limit of the stroke of the slider 158, so that when the stroke of the slider 158 ends due to the presence of an appropriate obstacle on the corresponding rail, a further extraction of the tank 140 entails the disengagement of the mouth 152 from the connector 153 and the corresponding blocking of the connector 153 by the valve 157 before the tank 140 begins to entrain in sliding extraction the lid 141.

In practice it has been found that the device according to the invention achieves fully the intended aim, since a reservoir that can be extracted from the front of the machine and from the bottom of the beverage container support makes it possible to avoid providing an adapted space laterally and/or to the rear of the machine in order to allow removal of the reservoir.

The same arrangement of the reservoir allows at the same time separating it from the heating components of the machine, preventing the forming of scale and the proliferation of microorganisms that can impair the quality of the water.

The possibility of a partial extraction furthermore allows topping up the reservoir even during beverage extraction.

The means that prevent complete separation of the reservoir from the machine make it possible to avoid losses of water in the seat of the reservoir, for example the escape of liquid from the ducts in the machine downstream of the connector of the reservoir.

The fact that the reservoir used in the invention can have a lid allows advantageously a reduction of the volume of water present in the reservoir and lost due to evaporation phenomena and makes it possible to prevent the water vapor that is generated by said evaporation phenomena from damaging the components inside the machine, reducing its lifespan.

Although the device according to the invention has been conceived in particular for machines for extracting espresso coffee, it can in any case be used more generally for machines for preparing beverages by means of water under pressure, even weak pressure, drawn from a reservoir that is built into the machine.

The device thus conceived is susceptible of numerous modifications and variations, all of which are within the scope of the appended claims; all the details may furthermore be replaced with other technically equivalent elements.

In practice, the materials used, as well as the dimensions, may be any according to the requirements and the state of the art.

The disclosures in Italian Patent Application No. MI2013A000345 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A machine for preparing beverages, comprising a base and a head for dispensing the beverage, said head provided with an extraction chamber adapted to accommodate a portion of at least one ingredient of the beverage, and connected to a water reservoir by means of a pump, said machine comprising a support for a container of the beverage dispensed by said dispensing head, wherein said support of the container of the beverage is interposed axially between said dispensing head and said reservoir, so that said dispensing head, said support of the beverage container and said reservoir are crossed by an axis that is perpendicular to said base, wherein said reservoir is configured to be extractable at least partly from said machine and comprises at least one connector, and wherein said pump comprises an intake tube provided with a mouth that is coupled detachably to said at least one connector, so as to detach itself from said at least one connector when said reservoir moves beyond a top-up position.

2. The machine according to claim 1, wherein said water reservoir is configured to move with respect to said base between at least two positions in which said reservoir remains in fluid connection with said pump, said at least two positions comprising said top-up position in which said reservoir provides on an outside of said machine an opening for introducing water in said reservoir.

3. The machine according to claim 2, wherein said reservoir comprises a tank and said machine comprises at least one guide to allow a sliding movement that is perpendicular to said axis of said tank between said at least two positions.

4. The machine according to claim 3, wherein said reservoir comprises furthermore a lid that is adapted to cover at least partially said tank, said lid and said tank being able to slide with respect to each other, and wherein said machine comprises a stop element to prevent or limit traction of said cover by the tank during said sliding of the tank.

5. The machine according to claim 4, wherein said lid of the reservoir comprises at least one stroke limiter against which said tank abuts during the sliding of the tank toward said top-up position.

6. The machine according to claim 5, wherein said stop element comprises a hook that is adapted to interfere elastically with an abutment of said lid of the reservoir, so as to detach itself from said abutment following the traction of said lid by the tank in abutment against said at least one stroke limiter.

7. The machine according to claim 1, wherein said at least one connector is integral with said lid and is connected to an intake nozzle that protrudes from said lid to a bottom of said tank.

8. The machine according to claim 1, wherein said at least one connector is integral with a side wall of said tank and comprises a poppet valve that is loaded elastically toward said at least one connector in order to block said at least one connector, said mouth of the intake tube having such a length as to push said poppet valve away from said at least one connector when said mouth is coupled to said at least one connector.

9. The machine according to claim 1, wherein said mouth integrates monolithically an intake duct and a second duct, said intake duct being connectable to said intake tube of the pump.

10. The machine according to claim 1, wherein said reservoir comprises a water level indicator that is shaped like a pin that protrudes from a bottom of said reservoir to a maximum water level allowed in said reservoir.

11. The machine according to claim 1, wherein said reservoir is made of a material that is transparent to natural light.

12. The machine according to claim 11, wherein the surface of said reservoir that can be accessed from an outside of said machine is shielded, by means of a front plate, so as to shield an inside of said reservoir from light and comprises at least one window for inspecting a level of the water of the reservoir from the outside of the machine.

13. The machine according to claim 12, wherein said window is associated with at least one protrusion and/or hollow or other grip element adapted to provide a tactile indicator for gripping said reservoir.

14. A machine for preparing beverages, comprising a base and a head for dispensing the beverage, said head provided with an extraction chamber adapted to accommodate a portion of at least one ingredient of the beverage, and connected to a water reservoir by means of a pump, said machine comprising a support for a container of the beverage dispensed by said dispensing head, wherein said support of the container of the beverage is interposed axially between said dispensing head and said reservoir, so that said dispensing head, said support of the beverage container and said reservoir are crossed by an axis that is perpendicular to said base, wherein said water reservoir is configured to move with respect to said base between at least two positions in which said reservoir remains in fluid connection with said pump, said at least two positions comprising a top-up position in which said reservoir provides on an outside of said machine an opening for introducing water in said reservoir, wherein said reservoir comprises a tank and said machine comprises at least one guide to allow a sliding movement that is perpendicular to said axis of said tank between said at least two positions, wherein said reservoir comprises furthermore a lid that is adapted to cover at least partially said tank, said lid and said tank being able to slide with respect to each other, and wherein said machine comprises a stop element to prevent or limit traction of said cover by the tank during said sliding of the tank, and wherein said lid of the reservoir comprises at least one stroke limiter against which said tank abuts during the sliding of the tank toward said top-up position.

15. The machine according to claim 14, wherein said stop element comprises a hook that is adapted to interfere elastically with an abutment of said lid of the reservoir, so as to detach itself from said abutment following the traction of said lid by the tank in abutment against said at least one stroke limiter.

\* \* \* \* \*